(12) United States Patent
Batarseh et al.

(10) Patent No.: US 8,577,664 B2
(45) Date of Patent: **\*Nov. 5, 2013**

(54) SYMBOLIC SWITCH/LINEAR CIRCUIT SIMULATOR SYSTEMS AND METHODS

(75) Inventors: Issa Batarseh, Orlando, FL (US); Ehab Shoubaki, Orlando, FL (US); Shadi Harb, Gainesville, FL (US); Ghaith Haddad, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,460

(22) Filed: Jul. 9, 2012

(65) Prior Publication Data

US 2012/0331431 A1  Dec. 27, 2012

Related U.S. Application Data

(62) Division of application No. 12/035,137, filed on Feb. 21, 2008, now Pat. No. 8,219,374.

(60) Provisional application No. 60/902,582, filed on Feb. 21, 2007.

(51) Int. Cl.
*G06F 17/50* (2006.01)
*G06G 7/62* (2006.01)

(52) U.S. Cl.
USPC ............................................. 703/14; 703/13

(58) Field of Classification Search
USPC ................................................... 703/13–14
See application file for complete search history.

(56) References Cited

U.S. PATENT DOCUMENTS

| | | | |
|---|---|---|---|
| 5,761,485 | A | 6/1998 | Munyan |
| 5,937,158 | A | 8/1999 | Uranaka |
| 6,121,965 | A | 9/2000 | Kenney |
| 6,229,502 | B1 | 5/2001 | Schwab |
| D449,606 | S | 10/2001 | Lee |
| 6,313,828 | B1 | 11/2001 | Chombo |
| 6,335,678 | B1 | 1/2002 | Heutschi |

(Continued)

OTHER PUBLICATIONS

Yang, Ouyang, et al. "ECVlab: A web-based virtual laboratory system for electronic circuit simulation." Computational Science—ICCS 2005. Springer Berlin Heidelberg, 2005. 1027-1034.*

(Continued)

*Primary Examiner* — Mary C Jacob
*Assistant Examiner* — Aniss Chad
(74) *Attorney, Agent, or Firm* — Brian S. Steinberger; Phyllis K. Wood; Law Offices of Brian S. Steinberger, P.A.

(57) ABSTRACT

Interactive and real time web-based electrical circuit symbolic solvers and simulators. The invention includes an interactive and innovative graphical user interface (GUI) for creating circuit schematics and generating netlists, circuits symbolic solving and instant simulated solutions, their systems and methods. Users such as students can use GUI interfaces to remotely access a remote server controlled by educational institutions such as universities, or electronic book publishers, in order to draw, symbolically solve, and instantly simulate electrical circuits.

14 Claims, 14 Drawing Sheets

(56) References Cited

U.S. PATENT DOCUMENTS

| | | |
|---|---|---|
| 6,421,524 B1 | 7/2002 | Padgett |
| 6,530,065 B1 | 3/2003 | McDonald |
| 6,933,928 B1 | 8/2005 | Lilienthal |
| 6,959,425 B1 | 10/2005 | Krauklis |
| 6,966,026 B1 | 11/2005 | Sommerer |
| 7,017,159 B1 | 3/2006 | Baker |
| 7,260,781 B2 | 8/2007 | DeMello |
| 7,318,014 B1 | 1/2008 | Molson |
| 7,441,219 B2 | 10/2008 | Perry |
| 7,475,000 B2 | 1/2009 | Cook |
| 2005/0027491 A1* | 2/2005 | Fertner et al. ................. 702/196 |

OTHER PUBLICATIONS

Kinney, Web-Based Interactive Circuit Simulator for Introductory Physics, 2004, University of Delaware.

Falstad, Circuit Simulator, 2005.

Tosic, et al., Advances in Symbolic Simulation of Systems, The IPSI BgD Transactions on Advanced Research, 2006, pp. 9-14, vol. 3, No. 1.

Lutovac, et al., Schematic Solver Version 2.0 User Manual, 2003-2004.

Rodanski, et al., Symbolic Analysis, Taylor & Francis Group, LLC, 2006.

* cited by examiner $$\begin{vmatrix} m_{11} & m_{12} & m_{13} & m_{14} & \cdots & \cdots & m_{1n} \\ m_{21} & m_{22}+\dfrac{1}{X_o} & m_{23} & m_{24} & \cdots & \cdots & m_{2n} \\ \vdots & \vdots & \vdots & \vdots & \vdots & \vdots & \vdots \\ m_{k1} & m_{k2}-\dfrac{1}{X_o} & m_{k3} & m_{k4} & m_{k5}+\dfrac{1}{X_o} & \cdots & m_{kn} \\ \vdots & \vdots & \vdots & \vdots & \vdots & \vdots & \vdots \\ \vdots & \vdots & \vdots & \vdots & \vdots & \vdots & \vdots \\ m_{n1} & & & & & & \end{vmatrix} \Rightarrow \left(\dfrac{1}{X_o}\right)^R \begin{vmatrix} m_{11} & m_{12} & m_{13} & m_{14} & \cdots & \cdots & m_{1n} \\ 0 & 1 & 0 & 0 & \cdots & \cdots & 0 \\ \vdots & \vdots & \vdots & \vdots & \vdots & \vdots & \vdots \\ 0 & -1 & 0 & 0 & 1 & \cdots & 0 \\ \vdots & \vdots & \vdots & \vdots & \vdots & \vdots & \vdots \\ \vdots & \vdots & \vdots & \vdots & \vdots & \vdots & \vdots \\ m_{n1} & & & & & & \end{vmatrix}$$

$R \to$ *Number of rows $X_o$ appears in*  $\quad X_o \to 0$

Fig. 13

SYMBOLIC SWITCH/LINEAR CIRCUIT SIMULATOR SYSTEMS AND METHODS

This application applicant is a divisional application of U.S. patent application Ser. No. 12/035,137 filed on Feb. 21, 2008, now U.S. Pat. No. 8,219,374, which claims the benefit of priority to U.S. Provisional Patent Application 60/902,582 filed Feb. 21, 2007. The entire disclosure of each of the applications listed in this paragraph are incorporated herein by specific reference thereto.

FIELD OF INVENTION

This invention relates to interactive and real time web-based electrical circuit symbolic solver and simulators, in particular to an interactive and innovative graphical user interface (GUI) for creating circuit schematics and generating netlists, circuits symbolic solving and instant simulated solutions, their systems and methods.

BACKGROUND AND PRIOR ART

Typical simulation tools that students in the Electrical Engineering (EE) field encounter after starting their first Circuits course are numerical in nature that is when presented with an input circuit, they iteratively solve it across a set of small time steps. The result is represented as a data set of output versus time, which can be plotted for further inspection. Such results don't help the student understand the ultimate nature of circuits as Linear Time-Invariant systems with a finite dimensional basis in the solution space. PSpice is one example of a widely used software simulation tool that uses the approach mentioned earlier.

Currently there are no circuit solvers that are available online. If any, they would be of limited capabilities. For example, several Electrical Circuits books provide web-based circuit solvers for their examples used in the book. However, these solvers are very limited to the examples and they cannot be used to solve an arbitrary circuit.

The prior techniques do not develop enhanced problem solving skills using internet as a portable platform for the education environment. The prior techniques do not develop design skills and sharpen critical thinking. The prior techniques do not develop global and comprehensive teaching circuit tools which can be adopted nationally for educational purposes.

Thus, the need exists for solutions to the problems with the prior art.

BRIEF DESCRIPTION OF THE FIGURES

FIG. 13 shows a Pre-determinant evaluation limit finding algorithm.

SUMMARY OF THE INVENTION

Figure 1:
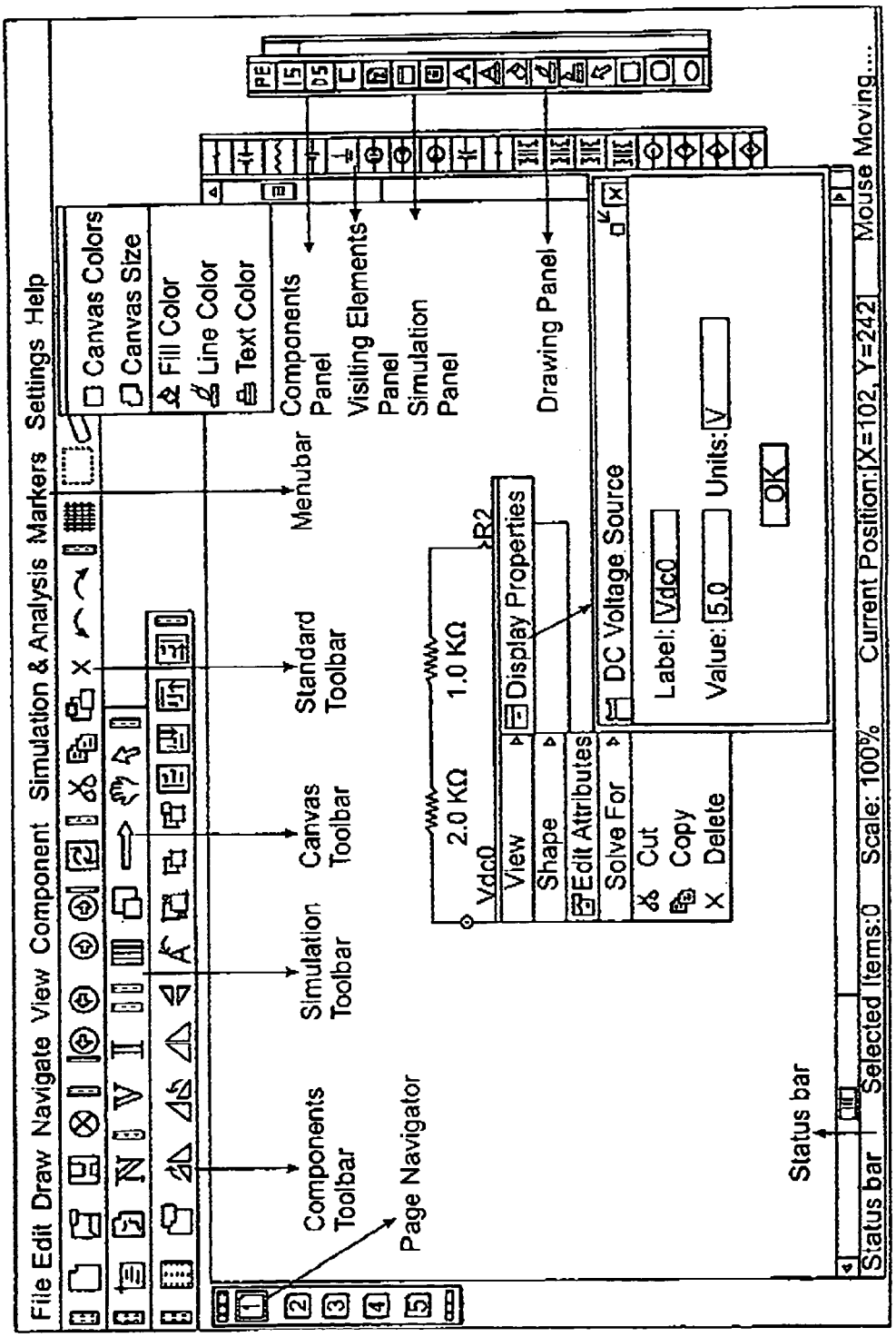
FIG. 1 shows an overview screen shot of the innovative GUI (graphical user interface).

A primary objective of the present invention is to provide interactive and real time web-based electrical circuit symbolic solver and simulators, systems and methods, that develop enhanced problem solving skills using internet as a portable platform for the education environment.

A secondary objective of the present invention is to provide interactive and real time web-based electrical circuit symbolic solver and simulators, systems and methods that develop design skills and sharpen critical thinking.

A third objective of the present invention is to provide interactive and real time web-based electrical circuit symbolic solver and simulators, systems and methods that develop global and comprehensive teaching circuit tools which can be adopted nationally for educational purposes.

Another objective of the present invention is to provide an interactive web-based circuit drawing tool for user interaction and Netlist generation. Students can use the online circuit drawer to carry out circuit simulation on the web and access it virtually from any place. The online simulator provides a user friendly graphical user interface (GUI), which has the capability to allow students to draw electrical circuits and engage the symbolic circuit solver on them.

Another objective of the present invention is to provide a versatile symbolic based linear circuit with switches solver. The solver works by accepting a Netlist from the drawing tool, and the element one wants to find the voltage across or current on, as input parameters. Then it either produces the plot or the time domain expression of the output. Frequency domain plots or Symbolic Transfer Functions are also produced. The solver gets its input from the circuit drawer.

The SymCirc Symbolic Solver provides all simulation results as Time domain expressions composed of the basis functions that exclusively include exponentials, sines, cosines and/or t raised to any power. When the student continuously encounters such solution forms and correlates them with the plots, it drives him or her more smoothly into a deeper understanding of the subject matter on a level that would otherwise require much effort and time.

The invention writes all components in the Java programming language due to its extensive support of web applications.

Further objects and advantages of this invention will be apparent from the following detailed description of the presently preferred embodiments which are illustrated schematically in the accompanying exhibits.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also the terminology used herein is for the purpose of description and not of limitation.

A list of components will now be described.
1 Screen Shot of Graphical User Interface (GUI)
5 Menubar
10 Standard Tool Bar
15 Canvas Toolbar
20. Simulation Toolbar
25. Components Toolbar 30 page Navigator
35 Status bar
40. Components Panel
45 Visiting elements Panel
50. Simulation Panel
60 Drawing Panel
70 View menu
75 Display Properties
80. DC voltage source inputs
100 Three Loop Circuit
110 Resistor Checker
200. Netlist Generator Flowchart
300. Net list Generation Steps
400. Netlist to Schematic Generator Flowchart
500. Net Parser Module Flowchart
600. Symbolic Module Flowchart
700. Time Domain Module Flowchart
800. Switching Module Flowchart
900. Specific Execution Route Flowchart
GUI Interface The GUI interface has integrated functionalities, which provide the user with the capability to construct a circuit schematic and generate a netlist. The invention can use a GUI interface system such as, but not limited to, one described in U.S. Pat. No. 6,121,965 to Kenney et al. which is incorporated by reference. The invention can use a remote server that is controlled by an educational institution such as a university, a technical school, a science school and academy, and the like. Additionally, the remote server can be an electronics book publisher, a science book publisher and a technical book publisher, and the like.

Students, scientists, engineers, and the like, or other users can remotely access the server-side through their GUI interfaces as long as the interface can run Java applications. See for example, Eckel, Bruce. Thinking in Java, $3^{rd}$ edition, 2002, which is nonessential subject matter incorporated by reference. The interfaces can include, but are not limited to, desktop computers, laptop computers, PDAs (Personal Digital Assistants), and the like.

The user can add components to the GUI grid and manage the schematic efficiently using the implemented GUI's panels, toolbars, menu bars, popup menus, and the like. The GUI gives the user the option to change the component's attributes and save the changes to the components database, as shown in FIGS. 1 and 2.

Figure 2:
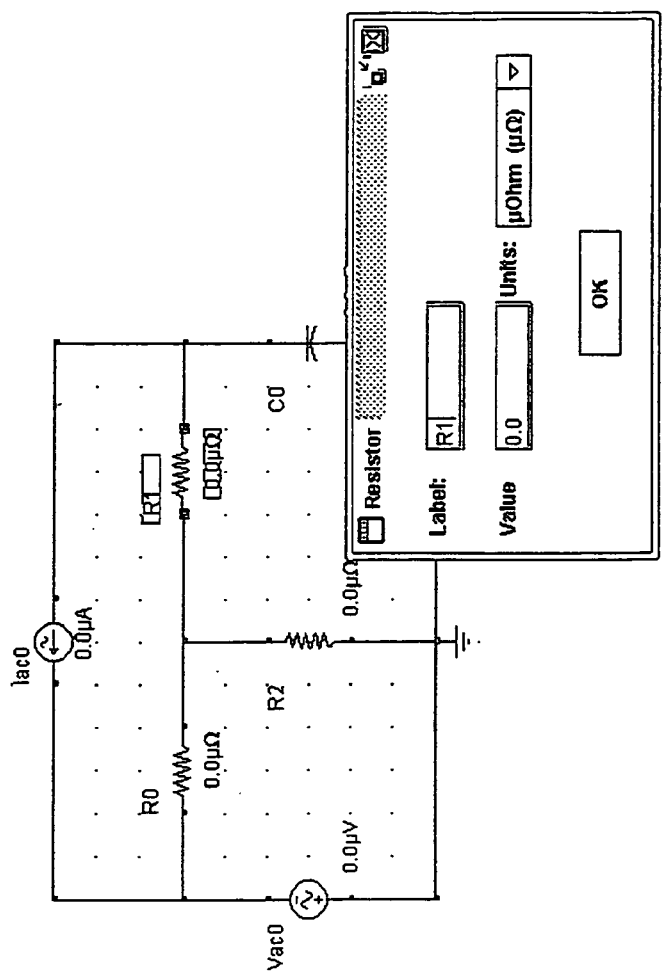
FIG. 2 shows an example of a three loop circuit.

FIG. 1 shows an overview screen shot of the innovative GUI (graphical user interface) 1. FIG. 2 shows an example of a three loop circuit 100 with Resistor checker 110. Referring to FIGS. 1-2, GUI screen 1 can include a Menu bar 5, Standard Tool Bar 10, Canvas Toolbar 15, Simulation Toolbar 20, Components Toolbar 25, Page Navigator 30, Status bar 35, Components Panel 40, Visiting elements Panel 45, Simulation Panel 50, Drawing Panel 60, View menu 70, Display Properties 75, DC voltage source inputs 80, that can be used to create a circuit having electrical components such as resistors in circuits that can be tested.

Figure 3:
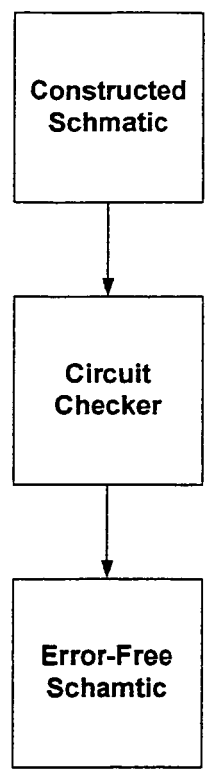
FIG. 3 shows a circuit checking flowchart.

The implemented circuit checker algorithm checks the connections of the constructed schematic for common circuit errors, such as an empty schematic, short circuit loops, floating nodes, ground does not exist, dependent controllers doesn't exist, and the like, and notifies the user accordingly. FIG. 3 shows the circuit checking algorithm flowchart.

Another main innovation is the implemented algorithm to generate the netlist from the schematic after checking the schematic for common circuit errors. The netlist generator has two phases: the network optimization, and the nodes assignment. In the network optimization phase, all the connection lines, which are electrically connected, must be merged and reduced to an identified net name. In the nodes assignment phase, all components are traversed to assign a net name for each component's node. If there are two components, which have nodes that are electronically connected by a connection line, they should be assigned the same net name.

Figure 4:
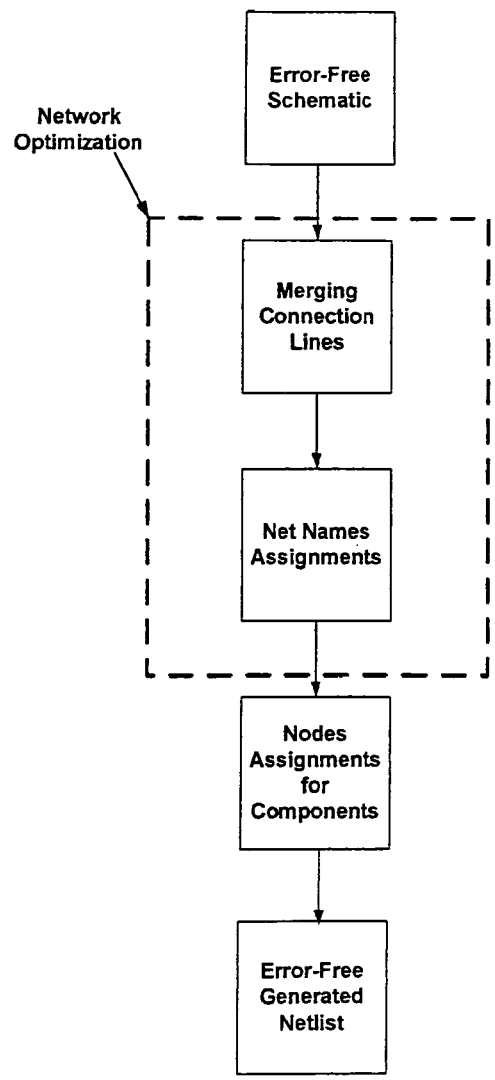
FIG. 4 shows a netlist generator flowchart.
Figure 5:
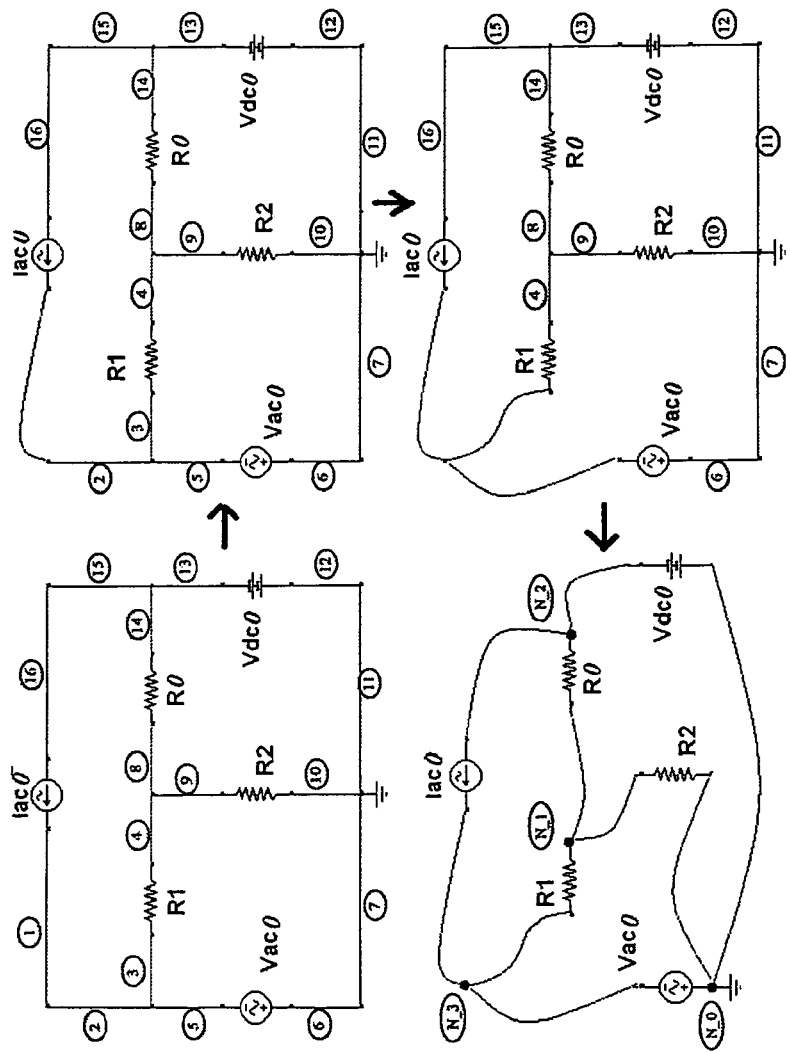
FIG. 5 shows a netlist generation steps overview.

The generated network of nodes and components is considered as a preliminary step for circuit simulation, which is fed through the symbolic solver engine for simulation and analysis. The Netlist generation flowchart and steps are shown in FIGS. 4 and 5 respectively. FIG. 4 shows a netlist generator flowchart 200. FIG. 5 shows a netlist generation steps overview 300.

Figure 6:
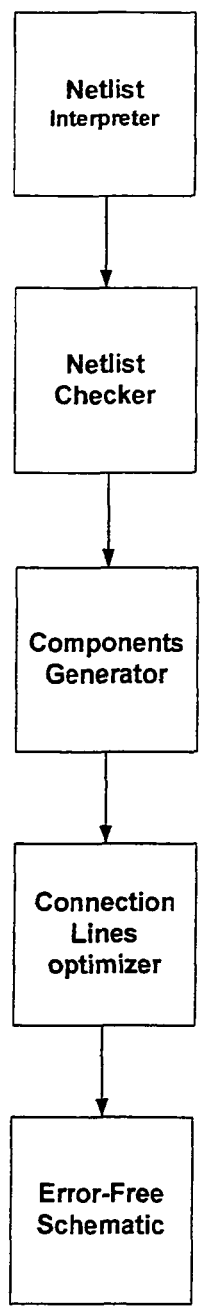
FIG. 6 shows a netlist to schematic generator flowchart.

The GUI interface has an implemented algorithm to convert a given netlist to a schematic by directly typing the netlist to the netlist editor, which is implemented in the GUI interface. The Netlist-to-Schematic generator 400 is comprised of the following four main modules as shown in FIG. 6:

1) The netlist interpreter, which interprets the netlist text to identified components names, nodes and attributes.

2) The netlist checker which checks the netlist from the common circuit and netlist errors.

3) The components generator, which builds the database of the identified components associated with nodes and attributes.

4) The connection lines optimizer is an implemented algorithm to draw the connection lines in the constructed schematic in very neat and organized presentation.

An interactive and real time web-based electrical circuit simulator (SymCir) is presented, which provides the user with an interactive and innovative graphical user interface (GUI) to create a circuit schematic and generate a netlist. The implemented algorithms to check the schematic for common circuit errors and generate the netlist from the schematic are the main innovated integrated features in the GUI interface. Furthermore, The GUI has the capability to enter the netlist and feed it directly to the simulator with the feature of constructing the schematic from the given netlist. The netlist is then sent to the symbolic solver engine for simulation and the results are returned back to the GUI for display.

SymCirc Symbolic Engine

The symbolic solver engine can be decomposed into five main components (modules A through E), as follows.

Figure 7:
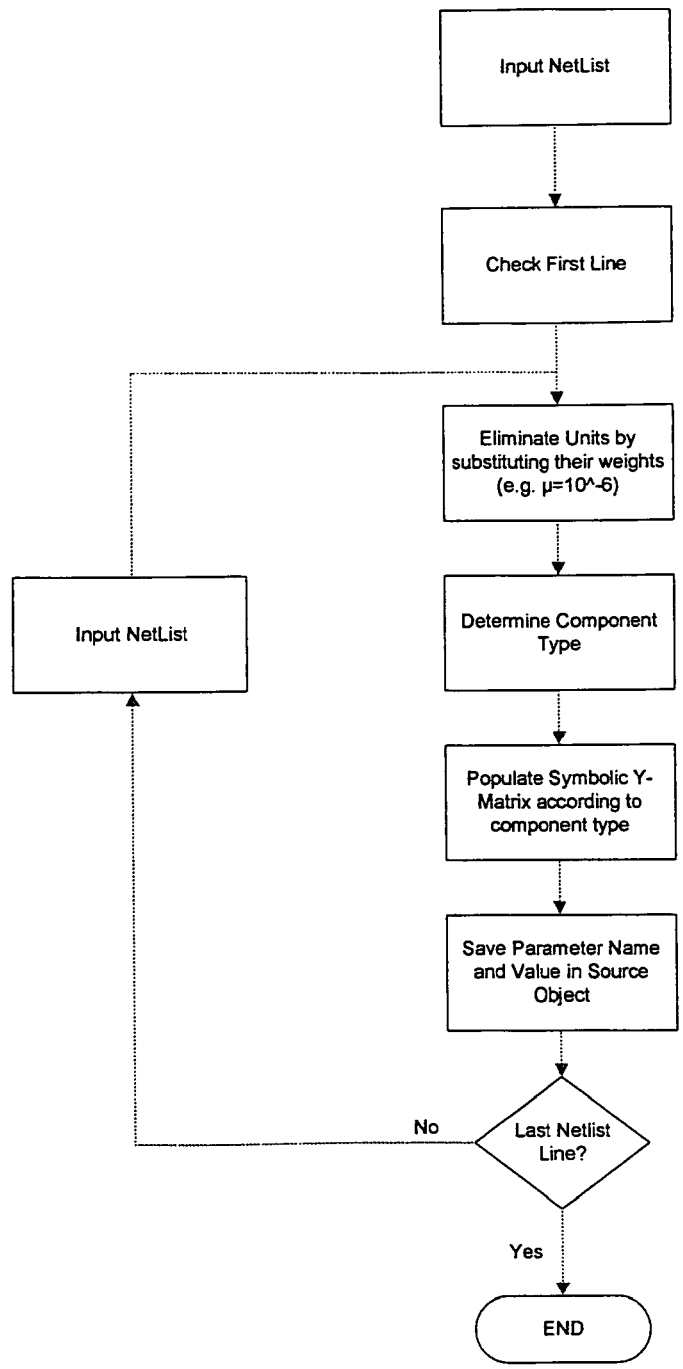
FIG. 7 shows a flowchart for Net Parser module.

A The Netlist Parser module: a module that converts a Netlist into a corresponding symbolic indefinite admittance matrix, while storing the values for the elements and inputs and other parameters like switch states for further use. The flowchart for this module is shown in FIG. 7. FIG. 7 shows a flowchart for Net Parser module 500.

Figure 8:
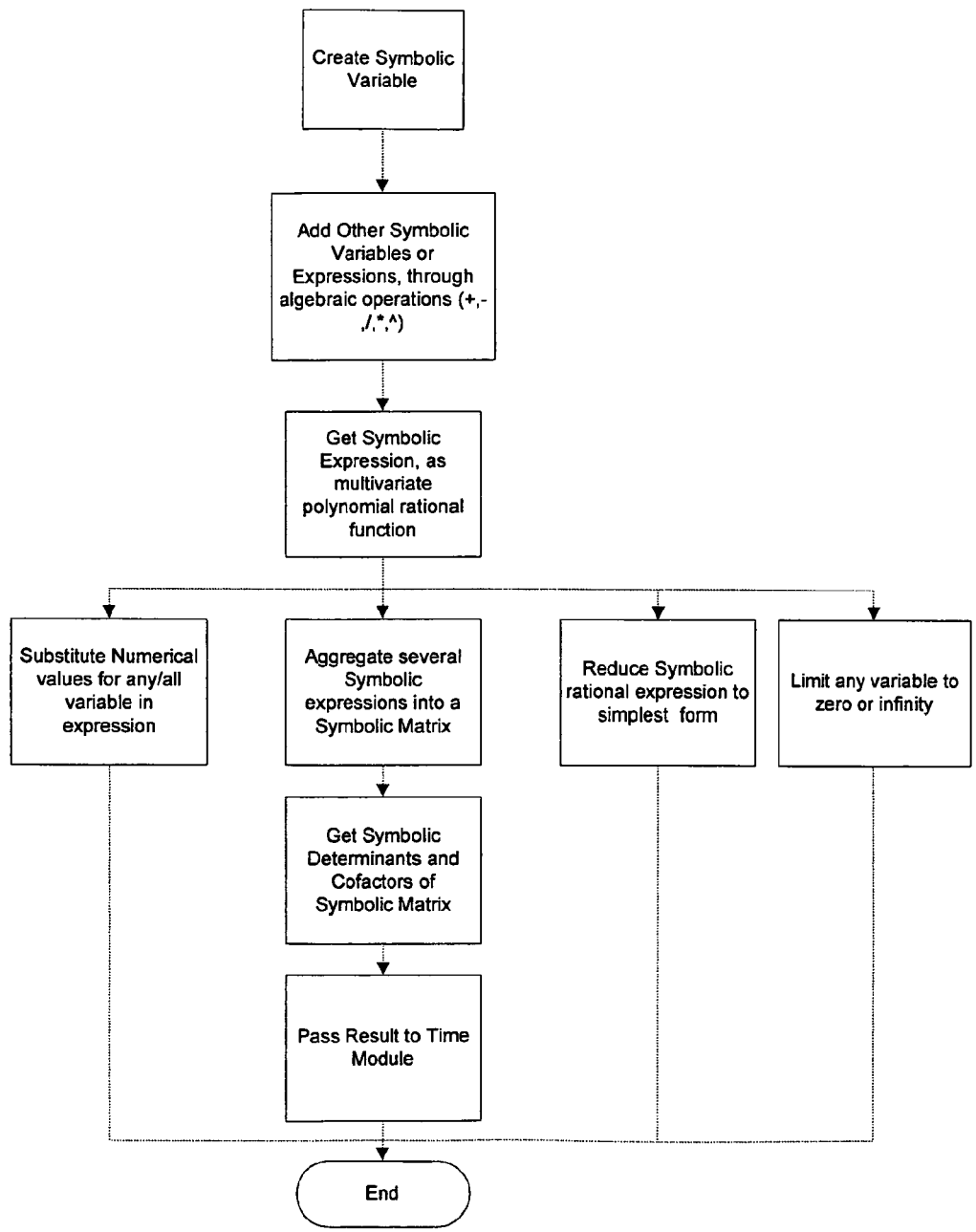
FIG. 8 shows a flowchart for Symbolic module.

B Symbolic module: a module that implements the capability of constructing symbolic variables, aggregating them into expressions (multivariate polynomial or rational), and manipulating them in different ways (simplification, substitution, finding limits, etc.). Those symbolic objects can also be combined into Symbolic Matrix Objects on which symbolic determinant calculation, cofactoring and population operations can be performed. This module is a critical part of SymCirc with which the tenets of the Indefinite Admittance Matrix approach for circuit analysis as described in Chen, Wai-Kai, Active Network and Feedback Amplifier Theory, Chapter 2, Hemisphere Publishing Corporation, 1980, which is none essential subject matter, which is incorporated by reference. The flowchart for this module 600 is shown in FIG. 8.

Figure 9:
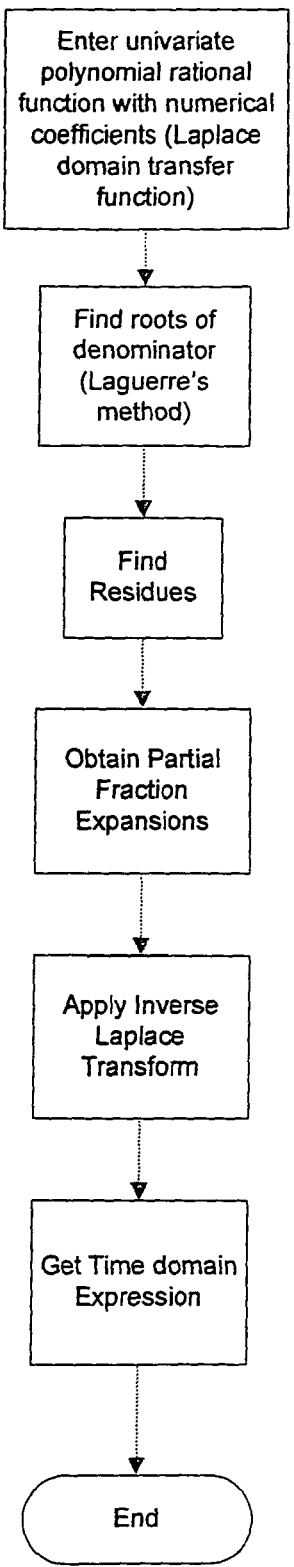
FIG. 9 shows a flowchart for Time Domain Module

C Time Domain Module: a module that picks up a rational function of s with numerical coefficients that represents the laplace transform of the output and through a process of road extraction, residue evaluation and applying the inverse laplace transform arrives at the time domain expressions of the signal at the output. The flowchart for this module 700 is shown in FIG. 9.

Figure 10:
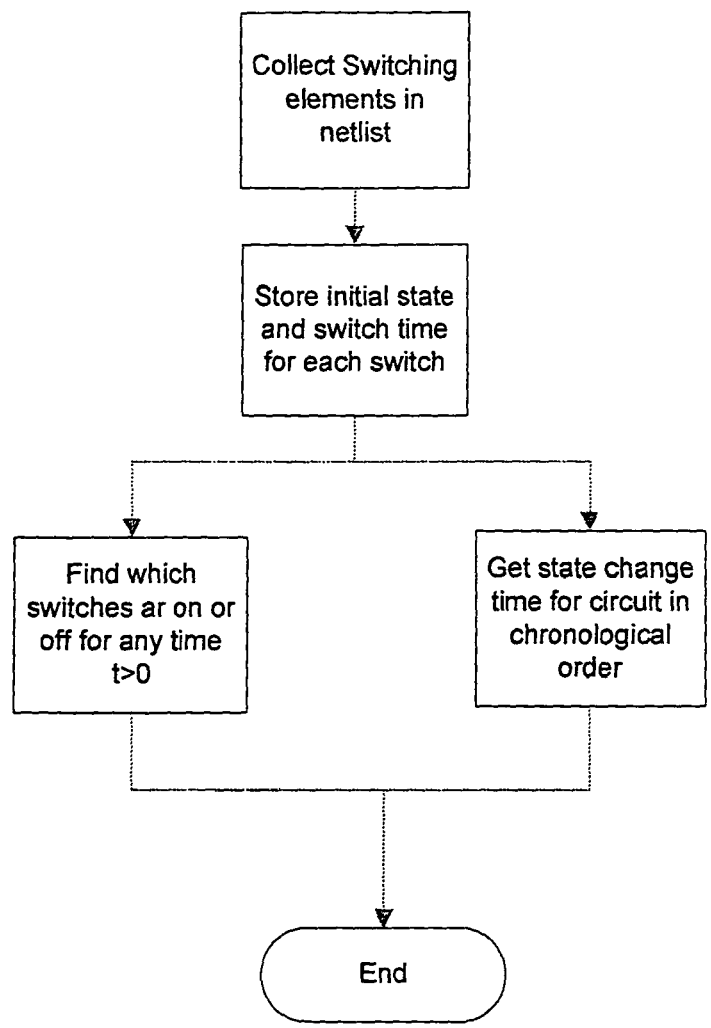
FIG. 10 shows a flowchart for Switching module.

D Switching Module: The part of SymCirc that collects information about the switches within the circuit and their states with respect to time. The flowchart for this module 800 is shown in FIG. 10.

E Plotter Module: A module that plots time and frequency domain plots of the simulation results, with ability to control domain, zoom level, resolution and time shift. It is built on top of jFreeChart which is an open source charting library for Java.

Figure 11:
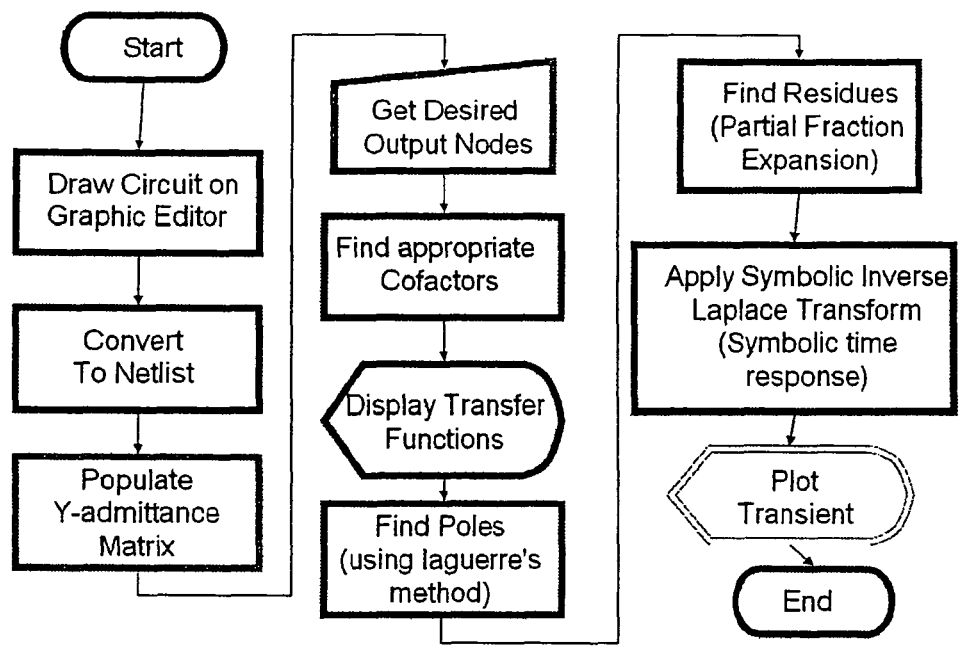
FIG. 11 shows an overview flowchart for a specific execution.
Figure 12:
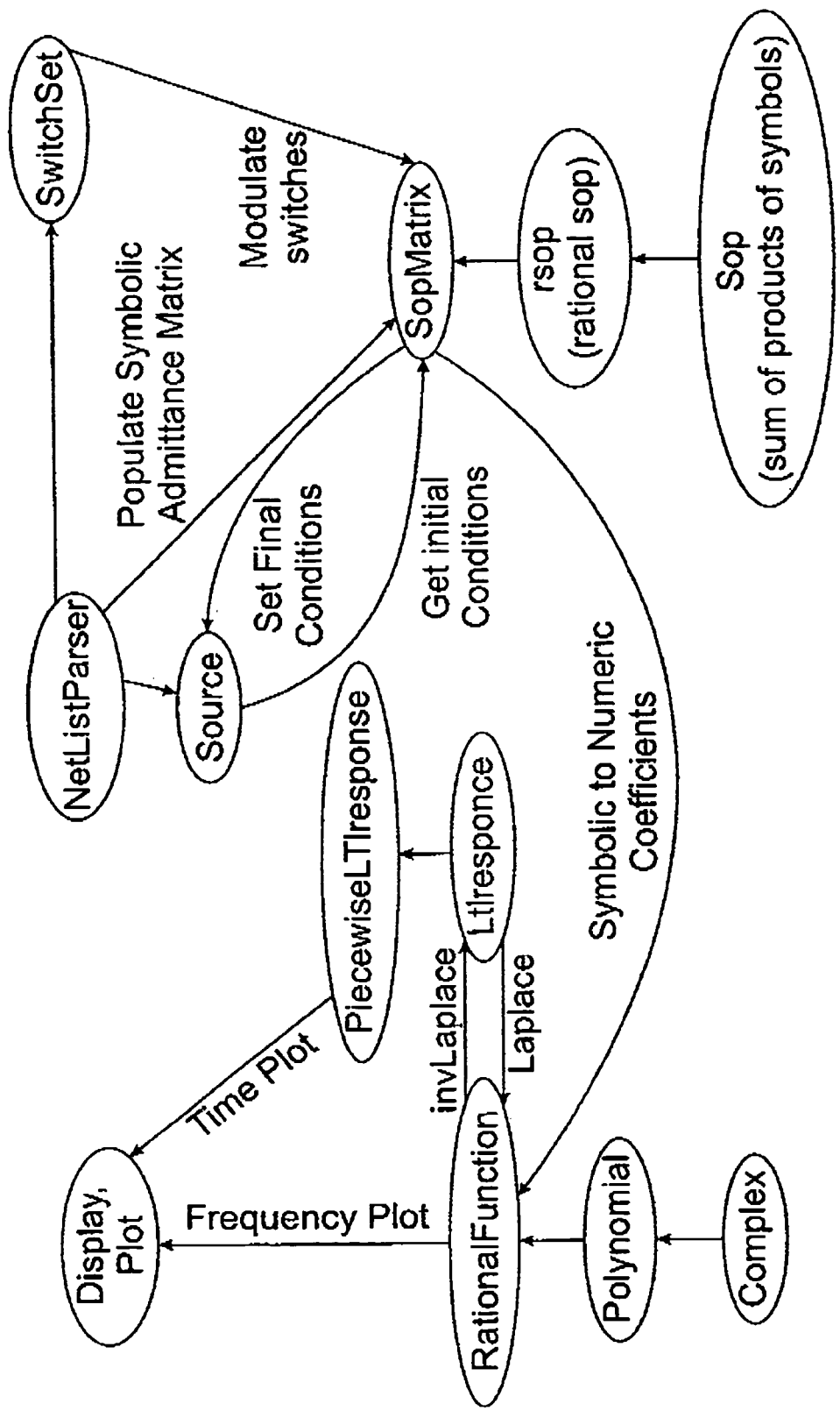
FIG. 12 shows Interrelationship diagram of Module classes

The SymCirc symbolic Engine receives the Netlist produced by a front end GUI circuit drawer and returns to the user either the symbolic transfer function, the time domain response as an expression or a plot, or the frequency response plot. The Engine is implemented in Java for web accessibility. It is capable of dealing with arbitrary Linear circuits with Switching elements. FIG. 11 shows an overview flowchart 900 for a specific execution route. FIG. 12 shows an interrelationship diagram of modules (a to e) classes.

The implementation is built upon a Symbolic Algebra module that is used to apply the techniques discussed in Chen, Wai-Kai, Active Network and Feedback Amplifier Theory, Chapter 2, Hemisphere Publishing Corporation 1980, which is nonessential subject matter incorporated by reference, on symbolic variable entries rather than numeric ones.

Innovations in the application of those techniques include a unified approach to presenting the dependent sources by the introduction of dummy parameters that are limited to zero, applying a novel method of finding said limits before evaluating the determinant since determinant evaluation is the bottleneck. Finally, another innovation is the treatment of all sources as impedances then finding specific transfer functions by applying the limiting procedure directly on the produced transfer function therefore eliminating the need to evaluate determinants more than once.

Figure 14:
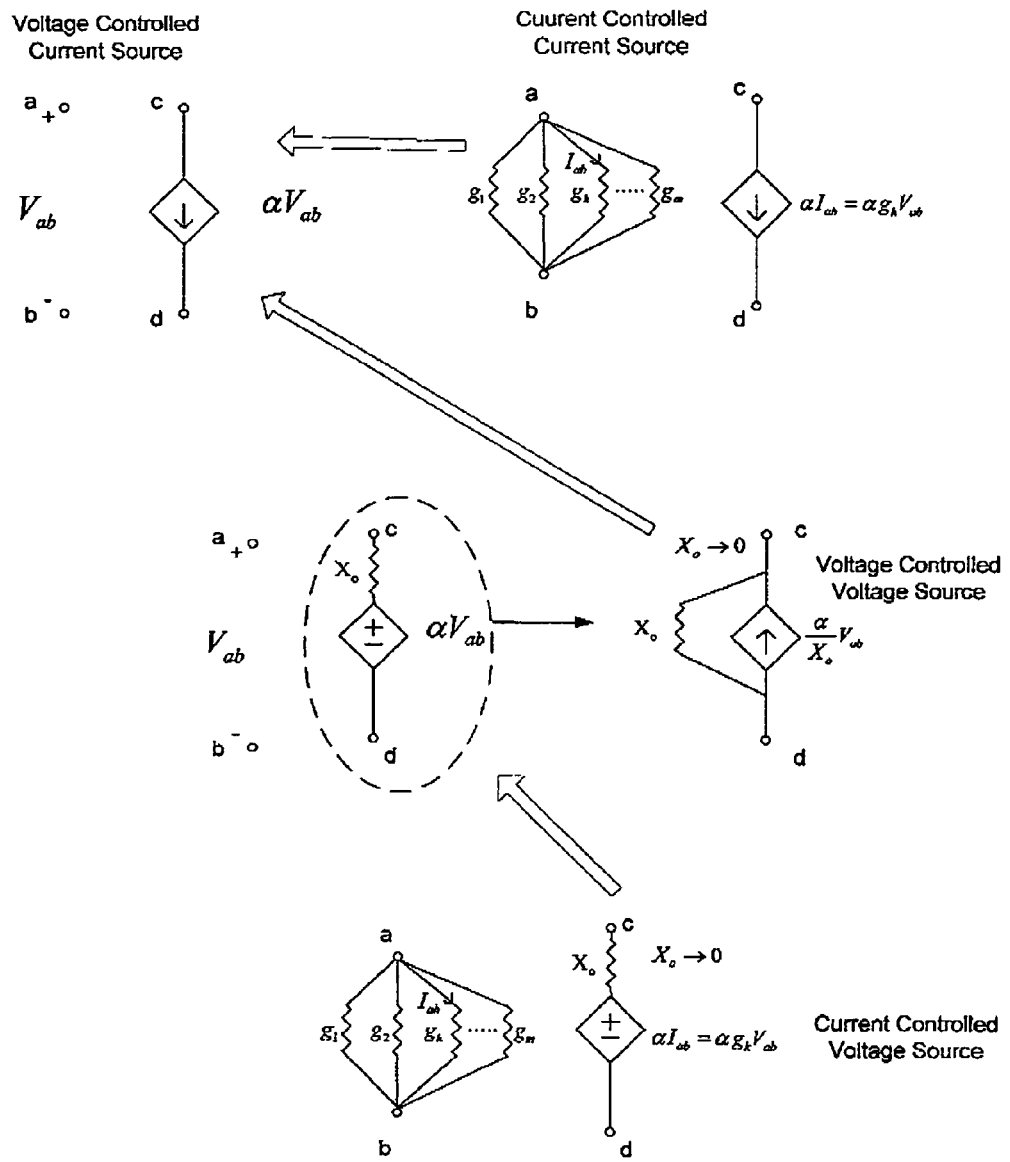
FIG. 14 shows Reduction of all dependent sources to VCCS case

The main innovative aspects in the implementation of the SymCirc symbolic solving Engine stem from the fact that the, 1. Indefinite Admittance Matrix, from which the response is computed, is populated with symbolic rather than numerical elements
2. The developed procedure for finding limits at infinity and zero for symbolic expressions allows a much simpler attack of the problem of evaluating the cofactors and determinant as described in Chen, Wai-Kai, Active Network and Feedback Amplifier Theory, Chapter 2, Hemisphere Publishing Corporation, 1980, which is nonessential subject matter incorporated by reference and furthermore suggests a way of unifying how the four dependent sources populate the Matrix.
3. Rather than treating dependent current and voltage sources as separate cases, where the dependent voltage source would be considered as a constraint that reduces the size of the admittance matrix, a special symbolic impedance Xo is added to the voltage source in series. After applying Norton's theorem the voltage dependent source reduces to a current dependent source, which is easier and more efficient to populate within the matrix as shown in Chen, Wai-Kai, Active Network and Feedback Amplifier Theory, Chapter 2, Hemisphere Publishing Corporation, 1980. Later, the limit finding algorithms are invoked to force all Xo terms to approach zero and therefore disappear. FIG. 8 summarizes how all the dependent sources relate to the Voltage Controlled Current Source.
4. When dependent sources exist in the circuit, the limit finding functions manipulate the cofactor matrices before finding the determinant so as to reduce the complexity and length (therefore reducing processing time) of the resulting transfer functions. This pre-determinant evaluation limit finding is done as elaborated in the example in FIG. 13 showing the cofactor that reduces to the transfer function numerator. The term $(1/Xo)^R$ that appears normally cancels out with an equivalent term in the cofactor of the denominator, unless the transfer function must reduce to zero, in that case power R of the denominator cofactor will be larger than the numerator power R. FIG. 14 shows the algorithm for reducing all dependent sources to Voltage Controlled Current Sources (VCCS).

Another innovation is the treatment of all independent sources (inputs and those representing capacitor and inductor initial conditions) as resistors and populating them into the admittance matrix as such. Due to the fact that the evaluation of the symbolic determinant step is a bottleneck in the code, this novel technique requires evaluating the determinant only once rather than the number of sources in the circuit as presented in Chen, Wai-Kai, Active Network and Feedback Amplifier Theory, Chapter 2, Hemisphere Publishing Corporation, 1980. The produced transfer function is then reduced to the correct form for a specific input by limiting the symbol representing that input to infinity (whether the input is a voltage or a current), and limiting all other symbols representing voltage and current sources to zero and infinity respectively.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of simulating a circuit and generating a netlist using an online circuit simulator comprising the steps of:
   providing a GUI (graphical user interface) interface with the online circuit simulator;
   constructing a simulated circuit using a circuit simulation set of instructions on a display;
   checking for errors in the simulated circuit with a circuit checker;
   generating a netlist from the errors checked simulated circuit;
   converting the netlist into a corresponding symbolic indefinite admittance matrix and storing values for circuit components, inputs and component parameters using a netlist parser set of instructions including:
   for each component,
   a first set of parser instructions to eliminate the component units by substituting their weights;
   a second set of parser instructions to determine a component type;
   a third set of parser instructions to populate a symbolic Y-matrix according to the component type; and
   a fourth set of parser instructions to save a parameter name and value in source object;

constructing symbolic variables, aggregating the symbolic variables into expressions, manipulating the symbolic variables and finding limits at infinity and zero for symbolic expressions;

obtaining a time domain expression from the results of the constructing, aggregating and manipulating step;

collecting information about a switching component in the simulated circuit and the state of the switching component with respect to time;

outputting at least one of a symbolic transfer function, a time domain response as an expression, the time domain as a plot or a frequency response plot; and plotting the time and frequency domain of the simulated results.

2. The method of claim 1, further comprising the step of:
accessing a remote web server hosting the GUI interface, the server being selected from at least one of a: an electronics book publisher web server, a science book publisher web server, a technical book publisher and a technical educational institution.

3. The method of claim 1, wherein the checked errors are selected from a group consisting of: an empty schematic, short circuit loops, floating nodes, ground that does not exist, dependent controllers doesn't exist, and combinations thereof.

4. The method of claim 1, wherein the netlist generation step includes the steps of:
providing a network optimizer phase; and
providing a nodes assignment.

5. The method of claim 4, wherein the network optimizer step includes the steps of:
merging all electrically connected connection lines; and
reducing the merged lines to an identified net name.

6. The method of claim 5, wherein the nodes assigner phase step includes the step of:
assigning all traversed components for each component node to a net name.

7. A symbolic circuit solving system using a GUI (graphical user interface) interface with an online circuit simulator comprising:
a processing device and memory for interfacing with the online circuit simulator;
the online circuit simulator for a user to draw a new electrical circuit containing components on a display, each component including one or more of a label, a value and a unit;
a netlist generator for generating a netlist of nodes and components from an error checked electrical circuit;
a netlist-to-schematic algorithm to convert the netlist of nodes and components to a test schematic; and
a symbolic solver engine to simulate the circuit shown in the test schematic, wherein the GUI interface is used as an online circuit simulator, the symbolic solver engine consisting of:
a netlist parser module to convert the netlist into a corresponding symbolic indefinite admittance matrix and storing values for circuit components, inputs and component parameters, the netlist parser module consisting of:
for each component,
a first set of parser instructions to eliminate the component units by substituting their weights;
a second set of parser instructions to determine a component type;
a third set of parser instructions to populate a symbolic Y-matrix according to the component type; and
a fourth set of parser instructions to save a parameter name and value in source object;
a symbolic module to construct symbolic variables, aggregating the symbolic variables into expressions and manipulating the symbolic variables;
a time domain module to produce a time domain expression from the results of the symbolic module;
a switching module to collect information about a switching component in the circuit and the state of the switching component with respect to time;
an output consisting of at least one of a symbolic transfer function, a time domain response as an expression, the time domain as a plot or a frequency response plot; and
a plotter module to plot the time and frequency domain of the simulated results.

8. The GUI system of claim 7, further comprising: a circuit checker to check electrical connections in the new electrical circuit for checking for errors in the new electrical circuit and notifying the user when errors are found.

9. The GUI system of claim 7, wherein the netlist-to-schematic algorithm consisting of:
a netlist interpreter for interpreting netlist text from a netlist to identified components names, nodes and attributes;
a netlist checker for checking the netlist for common circuit and netlist errors;
a component generator for building a database of identified components associated with nodes and attributes of the checked netlist; and
a connection lines optimizer for drawing connection lines from the database of the identified components to generate an error free schematic.

10. The GUI system of claim 7, wherein the circuit simulator includes: a Java program to run the simulator.

11. The GUI system of claim 10, wherein the checked errors are selected from a group consisting of:
an empty schematic, short circuit loops, floating nodes, ground that does not exist, dependent controllers that do not exist, and combinations thereof.

12. The GUI system of claim 7, wherein the netlist generator consisting essentially of:
a network optimizer phase; and
a nodes assignment.

13. The GUI system of claim 12, wherein the network optimizer consists of:
a merger for merging all electrically connected connection lines; and
a reducer for reducing the merged lines to an identified net name.

14. The GUI system of claim 13, wherein the nodes assigner phase consists of:
a traverser to traverse each components node; and
an assigner for assigning all traversed components for each component node to a net name, traversed components electrically connected by a connection line being assigned the same net name.

* * * * *